Baker & Miller,
Grapple.
N°59,542. Patented Nov. 13, 1866.
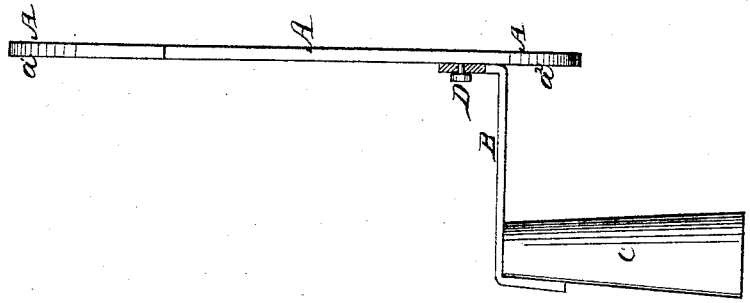
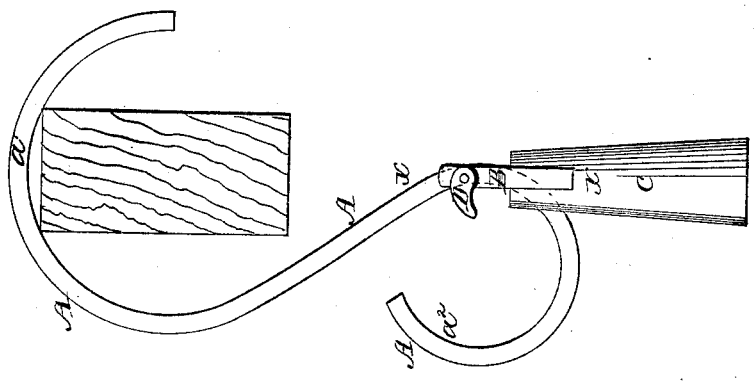
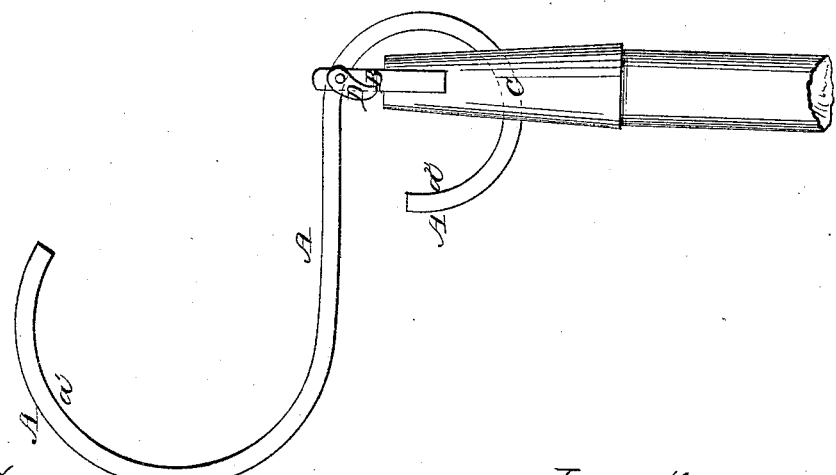

UNITED STATES PATENT OFFICE.

D. B. BAKER AND P. S. MILLER, OF ROLLERSVILLE, OHIO.

IMPROVEMENT IN PULLEY-SUSPENSION HOOK.

Specification forming part of Letters Patent No. 59,542, dated November 13, 1866.

*To all whom it may concern:*

Be it known that we, D. B. BAKER and P. S. MILLER, of Rollersville, in the county of Sandusky and State of Ohio, have invented a new and useful Improvement in Pulley-Suspension Hook; and we do hereby declare that the following is a full, clear, and exact description thereof, which will enable others skilled in the art to make and use the same, reference being had to the accompanying drawings, forming part of this specification, in which—

Figure 1 is a side view of our improved hook, showing its position while being raised for adjustment to its support. Fig. 2 is a side view of the same, showing its position when suspended. Fig. 3 is an edge view of the same, partly in section, through the line $x\,x$, Fig. 2.

Similar letters of reference indicate like parts.

Our invention has for its object to furnish an improved means by which the pulley of a horse hay-fork may be suspended from a rafter or other support of difficult access, and for similar uses, without the inconvenience and danger of clambering to the desired point of suspension and suspending the pulley by a chain or rope; and it consists of an improved pulley-suspension hook formed by the combination of the double hook, arm, stop, and socket with each other, said parts being constructed and combined substantially as hereinafter more fully described.

A is the double hook, formed of a bar of iron of a size proportioned to the weight it is expected to sustain. One end of said bar is bent so as to form a large hook, $a^1$, of such a size as will enable it to pass over the rafter or other support The other end of said bar is bent so as to form a small hook, $a^2$, of sufficient size to receive the eye of the pulley. The small hook $a^2$ should form an arc of a circle, as shown in the drawings.

At a point about half-way down the circling side of the small hook $a^2$, opposite to its point, the hook A is pivoted to the end of the bar or arm B, the other end of which is attached to the upper end of the socket C. This arm B should be of such a length that the pulley-eye and pulley may swing clear of the said socket C while being suspended.

C is an ordinary socket attached to the end of the arm B, into which is inserted the end of a long pole or handle, by means of which the hook may be raised to and lowered from its place of support. D is a stop, securely attached to or formed solid with the end of the pin, by means of which the arm B is pivoted to the hook A. The end of this stop rests against the shoulder of the arm B while the hook is being raised and lowered, and holds the said hook in a convenient position for being attached to or removed from the rafter or other point of support, as shown in Fig. 1.

In suspending the hook, the end of the handle or pole is inserted in the socket C and the eye of the pulley placed upon the small hook $a^2$. The weight of the pulley then brings the hook into the position shown in Fig. 1. This enables the end of the large hook $a^1$ to be readily passed over the rafter or other support. As soon as this has been done and the handle withdrawn the weight of the pulley brings the hook into the position shown in Fig. 2.

In removing the hook, the end of the handle or pole is inserted in the socket and the hook raised. As soon as the point of support is changed from the rafter to the pivot of the hook the weight of the pulley brings the hook into the position shown in Fig. 1, and allows the hook to be readily removed and lowered.

We claim as new and desire to secure by Letters Patent—

An improved pulley-suspension hook, formed by the combination of the double hook A, arm B, stop D, and socket C with each other, the said parts being constructed and combined substantially as herein shown and described, and for the purpose set forth.

D. B. BAKER.
P. S. MILLER.

Witnesses:
A. T. COOK,
A. B. COOK.